Jan. 8, 1929.
1,698,377
H. E. STONEBRAKER
THERMOMETER CASE
Original Filed Jan. 20, 1926
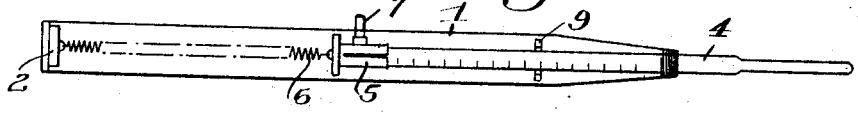
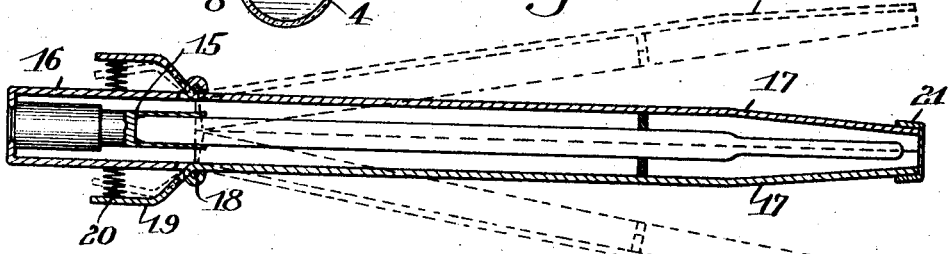
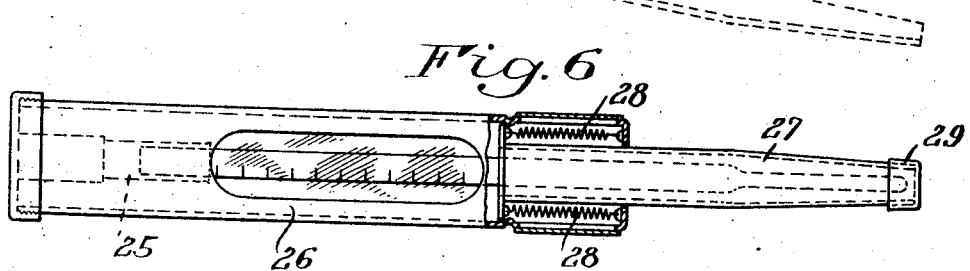
INVENTOR
Harold E. Stonebraker Patented Jan. 8, 1929.

1,698,377

UNITED STATES PATENT OFFICE.

HAROLD E. STONEBRAKER, OF ROCHESTER, NEW YORK.

THERMOMETER CASE.

Application filed January 20, 1926, Serial No. 82,483. Renewed October 25, 1928.

This invention relates to a thermometer case, with more particular reference to fever thermometers, and has for its object to provide a permanent housing designed to prevent accidental breakage of a thermometer if dropped while in use.

In its specific aspect, the invention is intended to afford a structure including a case or protective section with relative movement permitted between the case and the thermometer so as to expose the bulb of the latter for use, the arrangement being such as to instantly return the case around the thermometer when released.

The practice heretofore has been to carry a fever thermometer in a case, from which it must be entirely removed to be used, and frequent breakage occurs due to acidentally dropping a thermometer while it is out of its case in use. The economic loss from breakage of fever thermometers runs into thousands of dollars annually, and the purpose is to obviate this by so carrying the thermometer that if dropped, either when in use or otherwise, the thermometer is always within its case by the time it strikes a floor, while at the same time the structure does not interfere with convenient and proper use of the thermometer.

Another object of the improvement is to afford a case that serves as a permanent protective housing for the thermometer, and also serves in place of the conventional type of case from which the thermometer must be removed when put in use.

These and other advantages and purposes of the invention will be made clear from the following description considered in connection with the accompanying drawing, the novel features being pointed out in the claims at the end of the description.

In the drawing:

Figure 1 is a side elevation of one form of case incorporating a preferred embodiment of the invention, and with the thermometer inside;

Figure 2 is a similar view showing the thermometer partially ejected from the case for use;

Figure 3 is an enlarged sectional view of the structure of Figures 1 and 2;

Figure 4 is a transverse sectional view on line 4—4 of Figure 3;

Figure 5 is a longitudinal sectional view of a modified form of the invention, the movable housing sections being shown closed in full lines and partially open in dotted lines, and Figure 6 is a side elevation, partly in section, of another modification of the invention.

Referring more particularly to Figures 1 to 4 inclusive of the drawing, 1 designates a case or housing or guard made of suitable transparent, unbreakable material having a fixed closure 2 at one end and a screwthreaded cap or cover 3 at the opposite end. 4 designates the conventional fever thermometer that is suitably retained in a movable holder in the case, and to effect this, the thermometer may be frictionally carried in a holder 5, while 6 is a spring connecting the holder 5 with the closure 2.

Spring 6 acts to retain the holder 5 normally in the position shown in Figure 1, with the thermometer entirely within the case, and to return the holder to such position instantly when the thermometer is released. 7 is a finger piece carried by the holder 5, and projecting through a slot 8 in the case, and by means of said finger piece 7, the thermometer is moved endwise of the case when it is to be ejected for use. The body of the thermometer may be provided with one or more washers 9 of rubber or similar resilient material acting to center and guide the thermometer during its movement endwise of the case, the washer being cut away at 10 to permit convenient reading of the scale.

Normally the parts are arranged as shown in Figure 1. When it is desired to use the thermometer, the threaded cap 3 is removed and the finger piece 7 engaged and moved along the case 1, causing the bulb of the thermometer to be ejected as shown in Figure 2, so that it can be readily inserted into the mouth of patient and there held. If at any time during use of the thermometer, it is accidentally dropped by the patient, or by the attending nurse or doctor while handling it, spring 6 immediately withdraws the bulb of the thermometer within the case before at can strike the floor or any hard object, and breakage is thereby prevented.

The same result can be had by other constructions, as for instance, by having a section or sections of a case or guard movable with reference to a fixed thermometer holding part, and in Figure 5 is illustrated a modified arrangement in which the thermometer holder 15 is stationary with reference to the body 16 of the case. 17 designates a pair of movable sections or housings which are hinged to the stationary part of the case at 18 and carry finger pieces 19 controlled by springs 20 which normally, through the finger pieces 19, hold the movable sections 17 closed as shown in full lines. 21 is a cover or cap engageable over the ends of the sections 17, and when removed, by pressing the finger pieces 19 toward each other, as shown in dotted lines, the sections 17 are spread apart sufficiently to permit access to the bulb or the thermometer. When released, the sections 17 immediately close and protect the thermometer against breaking.

A further possible adaption of the invention is shown in Figure 6, in which the thermometer is retained in a holder 25 suitably arranged within a housing or guard 26. In this form, the housing comprises two relatively movable sections 26 and 27 which are connected by springs 28 that serve normally to hold the housing sections in the relation shown in Figure 6 with the thermometer entirely enclosed. When it is desired to use the thermometer, upon removal of the cap or cover 29, section 27 is pressed inwardly with reference to section 26, exposing the bulb and sufficient of the body of the thermometer to permit of its proper use, and upon releasing the section 27 it quickly assumes the normal relationship shown, affording a protective casing for every part of the thermometer.

While the invention has been disclosed with reference to several particular embodiments, it is not confined in its various applications to the details or arrangements shown, and this application is intended to cover any modification or practical uses of the invention that may involve disposing a thermometer within a case or guard so that relative movement is permitted between the thermometer and the case, or a section of the case, to expose the thermometer bulb for use, the thermometer and case or guard instantly resuming their normal relationship when released.

I claim:

1. The combination with a housing, of a thermometer holder movable endwise of the housing, a finger piece on the holder for moving the same, the housing having a slot to receive said finger piece, and a spring connecting the housing and holder and acting to return the holder when released.

2. The combination with a transparent housing, of a thermometer holder movable endwise of the housing, actuating means on the holder extending through the housing, and a spring connecting the housing and holder.

3. The combination with a housing, of a thermometer holder movable endwise of the housing, actuating means on the holder extending through the housing, and a spring connecting the housing and holder.

4. The combination with a housing, of a thermometer holder normally located at one end of the housing and movable toward the opposite end thereof, and connections between the holder and housing permitting relative movement to expose the thermomter bulb and acting when the holder is free to move it to the first mentioned end of the housing.

5. The combination with a housing, of a thermometer holder located so as to position a thermometer entirely within the housing when not in use, means extending outside the housing for moving the holder endwise of the housing, and connections between the holder and housing permitting relative movement to expose the thermometer bulb and acting when the holder is free to move it to its normal position with the thermometer inside the housing.

In witness whereof, I have hereunto signed my name.

HAROLD E. STONEBRAKER.